(12) United States Patent
Sipilä

(10) Patent No.: US 6,389,294 B1
(45) Date of Patent: May 14, 2002

(54) METHOD OF DETERMINING EFFECT OF RADIO WAVE MULTIPATH FADING

(75) Inventor: Kari Sipilä, Vantaa (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/180,705

(22) PCT Filed: May 27, 1997

(86) PCT No.: PCT/FI98/00321

§ 371 Date: Nov. 13, 1998

§ 102(e) Date: Nov. 13, 1998

(87) PCT Pub. No.: WO98/47244

PCT Pub. Date: Oct. 22, 1998

(30) Foreign Application Priority Data

Apr. 11, 1997 (FI) .................................................. 971540

(51) Int. Cl.⁷ .............................................. H04B 15/00
(52) U.S. Cl. ..................... 455/506; 455/192.1; 455/504
(58) Field of Search .......................... 455/192.1, 179.1, 455/422, 403, 525, 504, 506

(56) References Cited

U.S. PATENT DOCUMENTS

| | | | |
|---|---|---|---|
| 5,491,644 A | 2/1996 | Pickering et al. | 364/514 R |
| 5,574,466 A | * 11/1996 | Reed et al. | 342/359 |
| 5,669,063 A | * 9/1997 | Brockel et al. | 455/506 |
| 5,953,669 A | * 9/1999 | Stratis et al. | 455/449 |
| 5,987,328 A | * 11/1999 | Ephremides et al. | 455/446 |

FOREIGN PATENT DOCUMENTS

| EP | 0 664 619 | 7/1995 | H04B/7/26 |
|---|---|---|---|
| WO | WO 98/27770 | * 6/1998 | H04Q/7/36 |

OTHER PUBLICATIONS

"Estimating local mean signal strength of indoor multiphth propagation", Reinaldo A. Valenzuela, IEEE, Transaction on Vehiclular Tech., vol. 46, No. 1 pp. 203–212, Feb. 1997.*

"A ray tracing algorithm for microcellular wideband propagation modelling", G. E. Athanasiadou et al., IEEE on Vehicular Tech. conference, vol. 1, pp. 261–265, 1995.*

"A computer graphics package for indoor radio channel simulation using a 2D ray tracing algorithm",T. Holt et al., IEEE local computer network, pp. 511–518, 1992.*

"A ray tracing method for predicting path loss and delay spread in microcellular environments", Kurt R. Schaubach, IEEE Vehicular Tech. Conference, vol. 2, pp. 932–935, 1992.*

"A 2D ray tracing model for the characterization of spatial and time–domain properties of the indoor propagation channel", Michael Tobin et al., IEEE, pp. 1948–1951, 1995.*

* cited by examiner

Primary Examiner—Daniel Hunter
Assistant Examiner—Charles Chow
(74) Attorney, Agent, or Firm—Altera Law Group, LLC

(57) ABSTRACT

The invention relates to a method of determining the average effect of radio wave multipath fading in a desired area in a radio system. The desired area of a coverage area of a base station in the system is described by a digital map. The average effect of multipath fading of a transmitter output is determined in different sub-areas of the desired area. In order to reduce the computation amount signal fading parameters are determined at some point of each sub-area by a ray tracing method and the average effect of signal multipath fading in the sub-area is calculated using said parameters.

5 Claims, 2 Drawing Sheets

METHOD OF DETERMINING EFFECT OF RADIO WAVE MULTIPATH FADING

FIELD OF THE INVENTION

The invention relates to a method of determining the average effect of radio wave multipath fading in a desired area in a radio system, said method using an at least two-dimensional digital map to describe the desired area of a covering area of a base station in the system, and said method determining the average effect of multipath fading of a transmitter output in different sub-areas of the desired area.

BACKGROUND OF THE INVENTION

When a radio system is being constructed an attempt is made to achieve a desired coverage area with minimum costs. When considering the locations of the base stations of the system, the required traffic capacity and the achieved coverage area are taken into account. The aim is to locate the base stations so as to ensure an extensive coverage area and an advantageous location of the base station as far as the radio wave propagation is concerned.

Different methods and instruments have been developed for radio network planning. Digital maps providing modelled information on the terrain and buildings in the desired area are commonly used instruments in radio network planning. By means of a digital map a computer can be used to calculate coverage areas and parameters concerning the network operation for different base station locations.

When determining the base station coverage area it is important to determine signal fading in different areas. As the system behaviour is simulated signal fading also has to be modelled as realistically as possible. Particularly in an urban environment fading is a variable changing in time depending on the geometry of the buildings, walls and other scattering surfaces surrounding the base station and the terminal.

Fading is conventionally divided into two different types, fast and slow fading, but this is a very rough division. In reality signal multipath fading is caused by phase differences, and as the terminal moves the phase difference change results in back and forth variation of the signal strength typically seen at correlation distances from half a wavelength to hundreds of wavelengths depending on the environment.

In prior art solutions, in moving radio system simulators, for example in link-level simulators implemented by COSSAP, fadings are simulated by adding attenuation and fading to the transmitted signal. Fast fading is typically generated by simulating a stationary random process according to Rayleigh or Rice distributions. Hereafter fading is averaged using an appropriate filter.

In network planning software using the digital map, the signal attenuation is calculated, for example, on the basis of an empirical model where multipath fading is not taken into account except for certain special cases.

However, prior art methods have several problems and defaults. In typical link-level simulators implemented, for example by COSSAP, the receiving algorithms are realistic, but the problem is whether the channel model is realistic or not. A realistic channel model can be attained by ray tracing i.e. a ray search channel model. This is, however, obstructed by the computational complexity required by a ray tracing method impeding the implementation of the method.

In network planning software the resolution of the digital map can be raised to increase accuracy but then fading should be taken into account in order to calculate the strength of the field by the map resolution. In this case too, the ray tracing model taking multipath fading into account would improve accuracy but the required computation amount is too high.

BRIEF DESCRIPTION OF THE INVENTION

An object of the present invention is to provide a method by which the average effect of fading can be calculated with acceptable accuracy without a high computation load.

This is achieved by the method of the type set forth in the preamble characterized in that signal fading parameters are determined at some point in each sub-area by a ray tracing method and that the average effect of signal multipath fading in a sub-area is calculated using said parameters.

The method of the invention has several advantages. In the solution of the invention the computation time is short, a fraction of the time taken if the entire calculation were performed using the ray tracing method, in which case calculating an average for the sub-areas would require several computation points for each sub-area. The ray tracing method is currently the most accurate known method for obtaining realistic results of fading and attenuation values. In the solution of the invention, when the size of the sub-areas is appropriately selected, an estimation result that is acceptably accurate is, however, obtained.

BRIEF DESCRIPTION OF THE DRAWINGS

In the following the invention will be described in greater detail with reference to the examples of the accompanying drawings, in which.

DETAILED DESCRIPTION OF THE INVENTION

Figure 1:
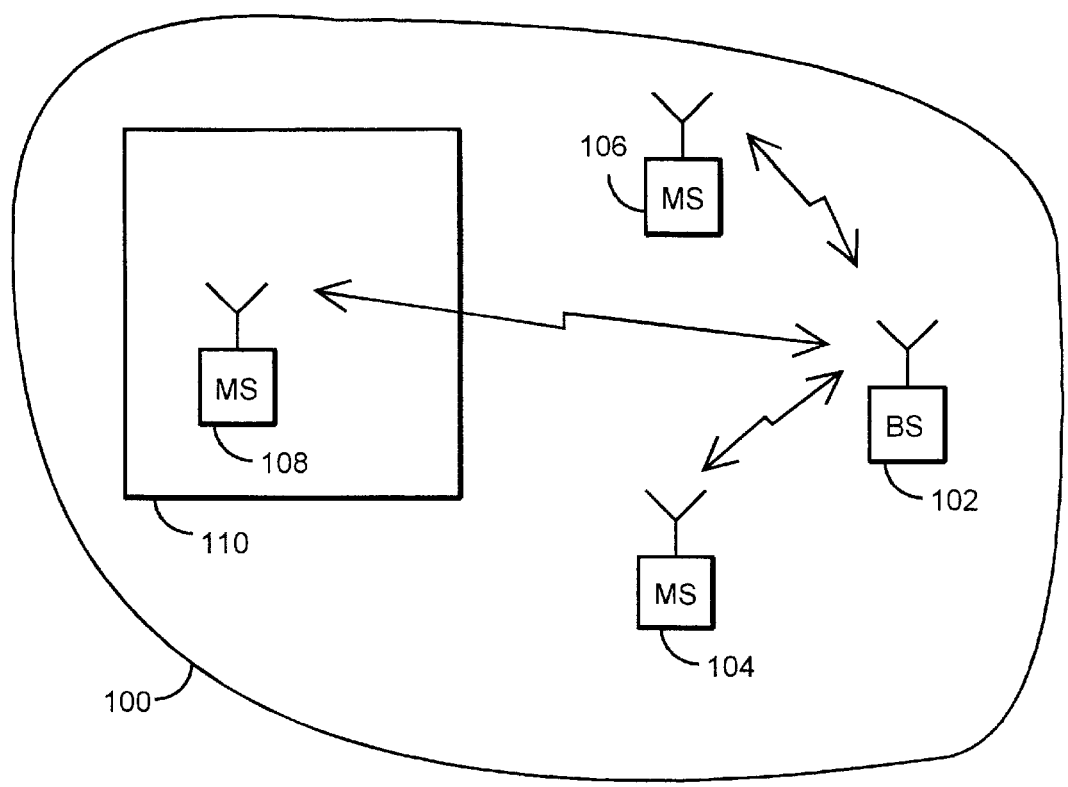
FIG. 1 illustrates a radio system, to the planning of which the method of the invention can be applied.

The method of the invention can thus be preferably applied in radio system planning. It is particularly suitable for planning radio systems implemented in an urban environment. FIG. 1 illustrates some typical radio systems. The Figure shows a cell 100 of a typical cellular radio network. A base station 102 of the cellular radio network is located outside the buildings comprising a plurality of subscriber terminals 104–108, some 104, 106 of which can be located outdoors and some 108 inside buildings 110. The subscriber terminals have a bidirectional connection to the base station.

The solution of the invention is based on the fact that multipath fading is caused by varying phase differences of multipath-propagated signal components arriving at a receiver from a transmitter. The aim is therefore to determine the average fading strength of a transmitter output in different sub-areas of a desired area. The sub-areas can, for example, be squares, the size of which being in accordance with the resolution of the digital map.

In the solution of the invention signal fading parameters are determined at one point in some sub-area of the desired area by a ray tracing method. In said point the amplitude, phase shift and arrival angle of the signal components are calculated. Next, it is assumed that the attenuation and arrival angle of the signal are constants in the entire sub-area and the average signal strength is determined by integrating over the sub-area using said parameters. The assumption about the parameters being constants is valid when the dimensions of the area to be examined are small compared with the ones of the surrounding scattering surfaces, such as wall dimensions.

Let us take a closer look at an example, and assume that the ray tracing method is used to determine the amplitude $a_i$, phase $\phi_i$ and arrival angle $\alpha$ of rays i that have arrived at a point. The average effective signal strength by a line segment can be calculated according to the following formula.

$$P_{ave} = \frac{1}{b}\int_{-b/2}^{b/2}\left|\sum_{m=1}^{M} a_m e^{-j\varphi_m + jkx\cos\alpha_m}\right|^2 dx$$

$$= \sum_{m=1}^{M}|a_m|^2 + \frac{4}{kb}\sum_{\substack{m,n=1\\n>m}}^{M} a_m a_n \cos(\varphi_m - \varphi_n) * \frac{\sin\left[k\frac{b}{2}(\cos\alpha_m - \cos\alpha_n)\right]}{\cos\alpha_m - \cos\alpha_n}$$

The average effective signal strength for a square pixel can, in turn, be calculated by the formula $$P_{ave} = \frac{1}{bl^2}\int_{-\frac{bl}{2}}^{\frac{bl}{2}}\int_{-\frac{bl}{2}}^{\frac{bl}{2}}\left|\sum_{m=1}^{M} a_m e^{-j\varphi_m + jk(x\cos\alpha l_m + y\sin\alpha l_m)}\right|^2 dxdy$$

$$= \sum_{m=1}^{M}|a_m|^2 + \frac{4}{k^2 bl^2}\sum_{\substack{m,n=1\\n>m}}^{M} a_m a_n \cos(\varphi_m - \varphi_n) *$$

$$\frac{\sin\left[k\frac{bl}{2}(\cos\alpha l_m - \cos\alpha l_n)\right]\sin\left[k\frac{bl}{2}(\sin\alpha l_m - \sin\alpha l_n)\right]}{(\cos\alpha l_m - \cos\alpha l_n)(\sin\alpha l_m - \sin\alpha l_n)}$$

where

| | | |
|---|---|---|
| $M$ | = | number of significant rays at the observation point |
| $a_i$ | = | amplitude of ray $i$ |
| $\varphi$ | = | phase of the $i$:th ray at the observation point, |
| $\alpha_i$ | = | angle of the $i$:th ray in relation to the direction vector of the terminal, |
| $\alpha l_i$ | = | angle of the $i$:th ray in relation to the pixel side, |
| $k$ | = | wave number $(2\pi/\lambda)$ |
| $b$ | = | averaging length or instantaneous terminal speed multiplied by averaging time, |
| $bl$ | = | width of the pixel. |

Figure 2:
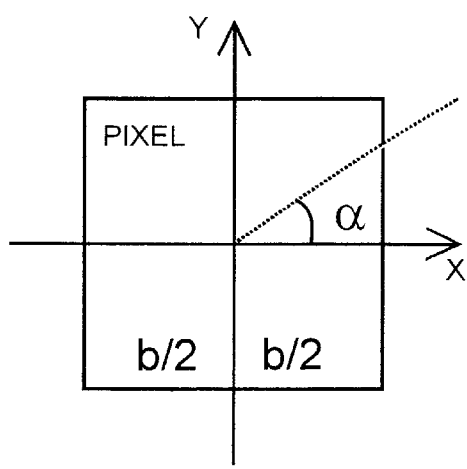
FIG. 2 illustrates parameters that can be obtained by a ray tracing method.

FIG. 2 illustrates the values in the case of the square pixel.

By means of the invention it is thus possible to calculate fadings in narrowband radio systems where the average signal strength or signal power is used as a planning parameter. When the method of the invention is used in a simulator of a moving radio network system, the ray tracing method needs to be used only at one point in an averaging interval. The averaging interval is generally short, for example 480 ms for GSM, meaning that the default on the arrival angle and attenuation remaining constant is valid. Realistic simulations are possible since the basis for the channel model is the correct geometry of buildings and walls.

In prior art network planning software multipath fading has generally not been taken into account except for ground reflection. However, it is important to take reflections into account if great accuracy is desired.

Figure 3:
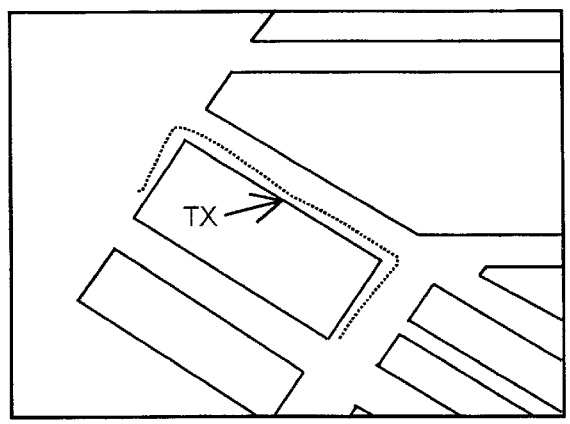
FIG. 3 illustrates an area by which fading is estimated and FIGS. 4a and 4b illustrate computational results.

Let us look closer at the method of the invention by means of an example. FIG. 3 illustrates a digital map in a typical environment in which a cell is to be located for the radio system. The map comprises the structural parts of the area affecting radio wave propagation. The aim is to locate the base station in the area so as to achieve the best possible audibility in different parts of the area. In practice some probable locations where the base station could be located are selected and a calculation is performed using these defaults. Finally the best alternative is selected to be the final location of the base station. In FIG. 3 the base station location is marked with the letters Tx and it is assumed that the terminal travels along the path marked by the dotted line.

Figure 4A:
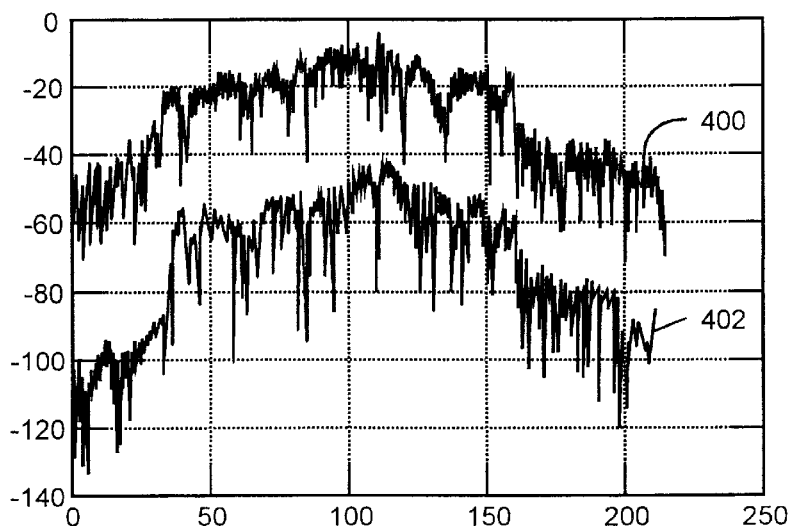
Figure 4B:
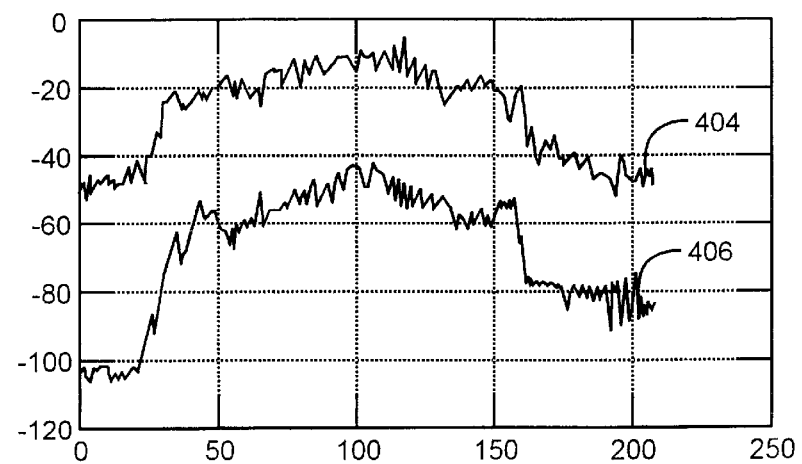

In this example fading is calculated both by using the method of the invention and, for comparison, by measuring while the terminal is traveling along the marked path in the environment described in the map. FIG. 4a shows the received signal power when the sampling interval is 11.1 ms and the terminal speed 5–10 km/h. Distance is shown on the horizontal axis. A curve 400 based on measurement results is raised upwards by 40 dB in order to enable the comparison with a simulated curve 402. Correspondingly FIG. 4b shows the received signal when the averaging interval is 0.5 s. A curve 404 based on measurement results is here too raised upwards by 40 dB to enable the comparison with a simulated curve 406. When calculating the simulation results in FIG. 4b each averaging interval includes the parameters of only one point that are calculated by the ray tracing method. This refers to 200 ray tracing calculations. When the number of data points exceeds 9000, the computation amount is significantly reduced compared to if everything were to be calculated by the ray tracing method. The Figure shows that it is difficult to predict individual fading holes, but statistically the results are good.

The method of the invention can also be applied in broadband radio systems. Except for radio systems where the average signal strength or signal power is used as a system parameter, the method of the invention can also be applied in systems where the average power has another meaning.

Even though the invention has been described above with refererence to the examples of the accompanying drawings, it is obvious that the invention is not restricted thereto but can be modified in various ways within the scope of the inventive idea disclosed in the attached claims.

What is claimed is:

1. A method of determining the average effect of radio wave multi-path fading in a desired area in a radio system, comprising:

using an at least a two-dimensional digital map to describe the desired area of a covering area of a base station in the system; and determining the average effect of multipath fading of a transmitter output in different sub-areas of the desired area, wherein determining signal fading values at only a single point of each sub-area by a ray tracing method, setting parameters of a given empirical formula using the values obtained using ray tracing calculations on the respective single point of each sub-area, and calculating the average effect of signal multipath fading in the sub-area surrounding the single point using the empirical formula.

2. A method as claimed in claim 1, wherein at some point of each sub-area of the desired area the amplitude, phase shift and arrival angle of rays arriving at said point are calculated by the ray tracing method.

3. A method as claimed in claim 1, wherein an average signal strength is determined in the different sub-areas of the desired area using the parameters calculated by the ray tracing method.

4. A method as claimed in claim 1, wherein when determining the average effect of signal multipath fading, one point in each averaging interval is calculated by the ray tracing method.

5. A method as claimed in claim 1, wherein the radio system is a cellular radio system.

* * * * *

UNITED STATES PATENT AND TRADEMARK OFFICE
CERTIFICATE OF CORRECTION

PATENT NO.    : 6,389,294 B1
DATED         : May 14, 2002
INVENTOR(S)   : Sipilä

It is certified that error appears in the above-identified patent and that said Letters Patent is hereby corrected as shown below:

Title page,
Following item [22] PCT Filed:, please replace "May 27, 1997" with
-- April 9, 1998 --.

Signed and Sealed this

Twenty-ninth Day of October, 2002

Attest:

JAMES E. ROGAN
Attesting Officer           Director of the United States Patent and Trademark Office